US008714834B2

(12) United States Patent
Cowen et al.

(10) Patent No.: US 8,714,834 B2
(45) Date of Patent: May 6, 2014

(54) MULTICHANNEL OPTICAL DATA COUPLER

(75) Inventors: Steven J. Cowen, San Diego, CA (US);
Samuel R. Bona, La Mesa, CA (US);
Charles M. Ringer, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 350 days.

(21) Appl. No.: 13/307,971

(22) Filed: Nov. 30, 2011

(65) Prior Publication Data
US 2013/0279846 A1 Oct. 24, 2013

(51) Int. Cl.
*G02B 6/36* (2006.01)
(52) U.S. Cl.
USPC ............. 385/56; 385/57; 385/74; 385/75
(58) Field of Classification Search
None
See application file for complete search history.

(56) References Cited

U.S. PATENT DOCUMENTS

| | | | |
|---|---|---|---|
| 4,119,362 A * | 10/1978 | Holzman | 385/74 |
| 4,265,511 A | 5/1981 | Nicia | |
| 4,448,478 A * | 5/1984 | Matthews et al. | 385/59 |
| 4,687,285 A | 8/1987 | Hily et al. | |
| 4,690,495 A * | 9/1987 | Giannini | 385/57 |
| 4,903,340 A * | 2/1990 | Sorensen | 398/117 |
| 4,911,523 A * | 3/1990 | Sondergeld et al. | 385/35 |
| 5,015,061 A * | 5/1991 | Giannini | 385/56 |
| 5,054,018 A | 10/1991 | Tremblay | |
| 5,064,268 A * | 11/1991 | Morency et al. | 385/87 |
| 5,488,682 A * | 1/1996 | Sauter et al. | 385/53 |
| 5,726,786 A | 3/1998 | Heflinger | |
| 5,940,564 A | 8/1999 | Jewell | |
| 5,963,684 A | 10/1999 | Ford et al. | |
| 6,443,626 B1 * | 9/2002 | Foster | 385/56 |
| 6,452,705 B1 * | 9/2002 | Paxton | 398/131 |
| 6,868,197 B1 | 3/2005 | Daniels | |
| 6,876,790 B2 * | 4/2005 | Lee | 385/33 |
| 6,956,992 B2 * | 10/2005 | Coleman | 385/33 |
| 7,083,337 B2 | 8/2006 | Farr et al. | |
| 7,136,552 B2 | 11/2006 | Luo et al. | |
| 7,298,942 B2 | 11/2007 | Blasingame et al. | |
| 7,572,063 B2 * | 8/2009 | Mynott et al. | 385/56 |
| 2002/0003931 A1 * | 1/2002 | Cairns et al. | 385/56 |
| 2003/0021555 A1 * | 1/2003 | Toth et al. | 385/100 |
| 2005/0013542 A1 | 1/2005 | Blasingame et al. | |
| 2006/0039655 A1 | 2/2006 | Wilson | |
| 2006/0056762 A1 | 3/2006 | Chen et al. | |

(Continued)

OTHER PUBLICATIONS

Thorlabs Catelog—Coupling Packages, Thorlabs Corp., Newton, NJ, 2011 catalog, downloaded Apr. 1, 2011.

*Primary Examiner* — Mike Stahl
(74) *Attorney, Agent, or Firm* — SPAWAR Systems Center Pacific; Kyle Eppele; Ryan J. Friedl

(57) ABSTRACT

An optical coupler is used to transmit optical data across a temporary connection. A housing is configured with a transparent interface window and positioned in front of a receiving optical coupler so that optical signals pass through the transparent interface window for reception by receiving optical coupler. The receiving optical coupler has a capability of accepting alignment errors caused by aligning the housing with a mating housing in an aquatic environment. Alignment is achieved via an alignment mechanism that mechanical positions the mating optical coupling components with sufficient alignment accuracy to permit the optical coupler to receive and transmit signals.

15 Claims, 3 Drawing Sheets

(56) References Cited

U.S. PATENT DOCUMENTS

2006/0222299 A1* 10/2006 Durrant et al. .................. 385/74
2006/0263009 A1 11/2006 Smith, III
2007/0297290 A1 12/2007 Vosburgh et al.
2008/0193135 A1 8/2008 Du et al.
2009/0232454 A1* 9/2009 Takahashi ...................... 385/54
2009/0324175 A1* 12/2009 Everett et al. ................... 385/72
2010/0027941 A1* 2/2010 Stewart et al. .................. 385/57
2012/0033916 A1* 2/2012 Lagathu et al. ................. 385/59
2012/0177322 A1* 7/2012 Schwandt et al. .............. 385/53
2013/0259423 A1* 10/2013 Charbonneau-Lefort ...... 385/33

* cited by examiner

MULTICHANNEL OPTICAL DATA COUPLER

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100670.

BACKGROUND

The present disclosure relates to optical couplers useful for establishing repetitive optical connections, such as often in use on autonomous vehicles.

SUMMARY

An optical coupler capable of transmitting optical data is configured to include a first and second optical coupler component, each located within a separate housing either of which is capable of transmitting and/or receiving optical data and transmitting the received optical data through an optical cable. The optical coupler has a capability of continued functionality in the presence of an extended range of misalignment between the respective coupler component housings. Alignment of the housings is established by positioning the two housings in proximity to each other such that an integrated mechanical alignment mechanism is engaged thereby ensuring acceptable alignment tolerances for data transmission within prescribed operating parameters.

DETAILED DESCRIPTION

Figure 1:
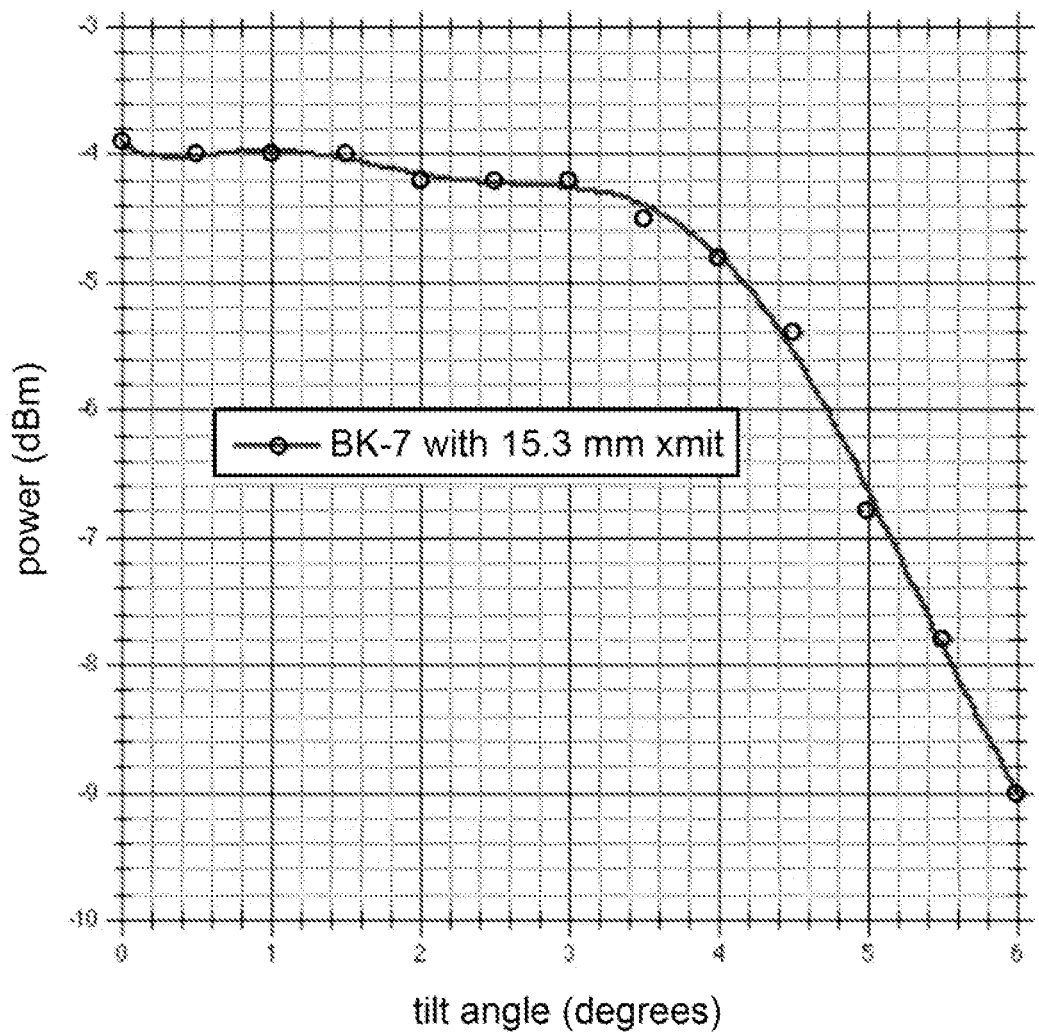
FIG. 1 is a graph showing the effect of angular misalignment of a ball lens coupler assembly.

The present disclosure provides a detailed description of optical data couplers that may be used for transmitting large quantities of digital data in a manner which allows data connections to be made autonomously and efficiently. The connection can be in any of a number of different operating environments, including but not limited to aqueous, such as water or other liquids, open air, air tight or subterranean, such as in the mining industry. For purposes of the following descriptions the primary example will be that of an underwater autonomous vehicle and a docking station, although the advantages of the present invention are equally applicable in numerous other settings as previously noted.

The physical communication layer is realized using multiple, bidirectional fiber optic data links. In one non-limiting example, a data coupler is capable of supporting a two independent optical channels for full duplex communication, in order to support protocol handshaking and re-transmit requests. Ideally the design should be readily expandable to more than two channels to support multiple, independent data streams using well-known wavelength multiplexing techniques.

The optical data coupler of the present invention is relatively insensitive to translational and angular misalignments in order to permit realistic manufacturing tolerances and to incorporate suitable clearances which are necessary to support automated coupling and uncoupling. The coupler is subjected to fouling which requires the use of imprecise tolerances in order to ensure optical coupling. This requirement is difficult to meet with conventional fiber optic connectors which require precise mechanical alignment in order to function properly. Additionally, it is desirable that the data coupler be tolerant of corrosion and fouling, such as would inevitably occur as a result of use of the device in a body of water such as the ocean, a lake, or river over extended periods of time.

Prior art optical data couplers have either required conversion of the optical signal into an electrical format or require that the polished faces (or images of the polished faces) of the individual optical fibers be accurately aligned in a pristine optical coupling environment. Conversion of the optical signal into an electrical format is often impractical for high bandwidth links and is expected to be even more difficult in the future, due to the trend of rapidly increasing bandwidths for fiber optic links.

Conventional connector designs requiring polished fiber ends also require that the ends of the individual optical fibers be accurately aligned in a pristine optical coupling environment. Such connector designs generally employ a reservoir of transparent oil and a series of wipers which remove contaminants from the oil in order to maintain a relatively benign environment for the optical coupling to take place. Such implementations are mechanically complex, expensive to purchase, exhibit excessive insertion and extraction forces during mating and de-mating, and is cycle limited as determined by the oil reservoir capacity requiring coupler replacement or reservoir replenishment on a regular basis.

A 1:1 magnification ratio is normally employed in an expanded beam fiber optic connector in order to provide minimum optical insertion loss at perfect alignment. The optical data coupler design according to the present disclosure is based upon an expanded-beam fiber optic connector in which the magnification ratio has been intentionally and significantly altered from 1:1. The configuration is such that the optical channel exhibits significantly increased insertion loss when the optics are perfectly aligned. However, with non-unity magnification, the resulting optical system provides a much increased range of alignment tolerances in both translational and angular error. Because the additional optical insertion loss is both constant and known it can be compensated for within an optoelectronic system by external means.

The insertion loss can be compensated for within the E/O system by incorporation of a more powerful transmitter, by use of a more sensitive receiver, or both. In practice, it is possible to construct an optical data coupler which is tolerant of several millimeters of translational misalignment and several degrees of angular misalignment and which is capable of transferring optical gigabit Ethernet data, error-free. These transmission rates can be achieved in murky seawater under fouled conditions.

Greatly decreased sensitivity to mechanical tolerances provides the data coupler designer freedom to incorporate the large clearances necessary to prevent physical binding due to corrosion and fouling during mating, which will always be present to some degree, especially in a system which is deployed for an extended period of time in water based environment. The teaching of the present invention also eliminates the necessity to manufacture matched highly accurate pairs of coupler components due to the fact that the optics are in effect de-tuned compared with perfect 1:1 imaging, and thus are much less sensitive to tolerances in general. Detuning makes a production ensemble of data couplers far more tolerant to manufacturing tolerances, as well. The transmitter portion of the coupler component's expanded optical beam provides robustness to any particulate matter that may be suspended in the water that occupies the gap between the two optical coupler components. As long as a portion of the transmitter's data light stream reaches the receiving fiber optic data link element of the mated optical coupler component the digital signal can be reconstituted. Typical data coupler designs having working safety margins of 100:1 (+20 dB) and even higher have been demonstrated.

Advantages of the presently disclosed technique include:

The optical data coupler design is completely agnostic to the data format it supports (i.e., the coupling is entirely optical in nature with no dependency on signal bandwidth, spectrum, waveforms, or data formatting).

The optical data coupler design has a low sensitivity to particulate contamination and fouling because the information-carrying optical beam is spread over a large cross-sectional area (if the entire beam is not blocked some of the light will get through to the receiver, permitting error-free data recovery).

The optical data coupler design exhibits translational error tolerances on the order of several millimeters and angular error tolerances on the order of several degrees, which permits design of an optical data coupler incorporating predetermined mechanical clearance to accommodate anticipated debris and fouling for the planned operating environment while also permitting fully automated coupling and uncoupling operation.

The optical data coupler design is expandable to multiple independent optical channels by the physical duplication of a single channel (high channel-to-channel isolation is provided by spatially separating the light beams) and/or by incorporating wavelength division multiplexing.

The optical data coupler is relatively inexpensive to manufacture because its design is simple; conventional machining tolerances suffice for its components; and no precision grinding or unit-to-unit matching is necessary to achieve repeatable performance between arbitrary pairs of optical data couplers.

The receiver optics of the data coupler component is comprised of a ball lens, that has an effect similar to a simple magnifying glass, and is placed in front of the receiver element optic pigtail. When no optics at all are employed in front of the fiber face, the fraction of the optical flux captured by the receiving fiber is nominally equal to the ratio of the area of the core of the fiber to the area occupied by the collimated beam. This ratio, in general, is a very small number, and thus it corresponds to a very high insertion loss. To remedy this problem a high refractive index ball lens is placed in contact with the face of the receiving fiber such that its effective distance from the principal plane formed by its convex surfaces is less than one focal length from the fiber face (i.e. just like a magnifying glass). In effect the end of the receiving fiber is magnified, thereby causing it to capture proportionally more light from the transmitter beam. This comes at the expense of reduced angular tolerance because the magnified image will be proportionally more sensitive to angle; however, significant fiber face magnification is possible before angle sensitivity becomes a problem, in practice.

A ball lens has characteristics similar to those of a thick, low f-number spherical plano-convex lens placed less than one focal length away from the face of the optical fiber. It is possible to control how much magnification the ball lens performs by changing its index of refraction.

To measure the angular sensitivity of a given configuration the transmit and receive optics were mounted in a pair of four axis kinematic optical mounts fastened to an optical rail (tilt up-down, tilt right-left, translation in x, translation in y). The transmit optic was a commercial off-the-shelf 37 mm collimator which interfaces with an ordinary fiber-optic connector with a threaded body, having physical contact (FC/PC connector)—it produces an optical beam diameter at the 1550 nm transmitter wavelength which is approximately 6 mm when used with single-mode fiber. The receive optic was fabricated from another FC/PC connector which contained a 62.5 µm core multimode fiber pigtail mounted in an ordinary Type FC/PC bulkhead receptacle. The 2.5 mm diameter ball lens is pressed into the FC/PC receptacles such that the surface of the ball physically contacts the face of the FC/PC connector. The 2.5 mm ID (internal diameter) spring sleeve inside of the FC/PC receptacle holds the ball lens firmly in place.

FIG. 1 is a diagram showing the effect of angular misalignment of a ball lens in a collimated beam of light. A commercially available SF-8 (strain-free) ball lens was selected as having a "strong" index of refraction. It appears that up to +/−5° of angular misalignment is possible using the SF-8 ball lens as the receive optic (if translational error is zero because the stage translation was peaked for each angle). Up until a certain angle, in this case approximately 4°, the optical power transmitted through the ball lens remains fairly constant, in this case, with a power loss of −3.8 db to −5 dB. This shows an acceptable tolerance to angular misalignment.

In an effort to optimize the working dynamic range and reduce the mechanical footprint of the coupler, a 15.3 mm collimator was substituted for the (much larger) 37 mm transmit collimator. The smaller resulting beam diameter, 2.5 mm, increased the received signal proportionally without imposing a translational tolerance which would be particularly difficult to satisfy. The stronger signal strength means that much more angular and translational error can be tolerated before the signal drops below threshold and the receiver begins to make data errors. The angular limitation of the optical mounts becomes quite evident, as it was still possible to have a strong optical signals at the maximum angular deflection of 6°(−9 dB of increased optical insertion loss).

Figure 2:
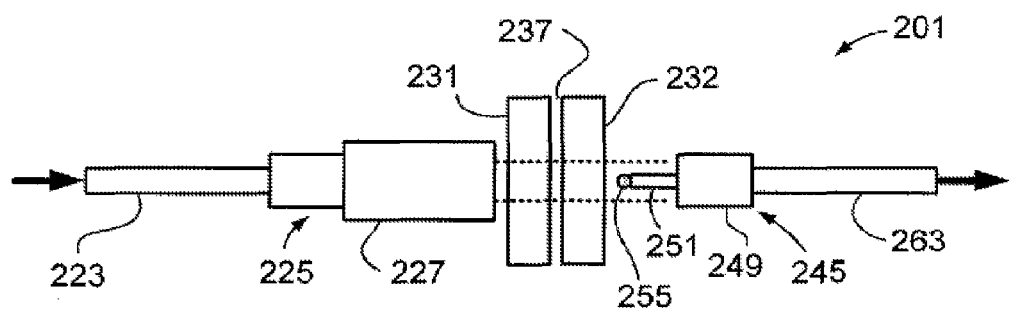
FIG. 2 is a diagram of an optical coupler used to transmit optical signals across a predetermined gap.

FIG. 2 is a diagram of an optical data coupler 201 using the described techniques. A first component of the optical data coupler receives an optical signal through optical cable 223, which terminates at connector 225 with transmitting optical coupler element 227. A transparent interface window plate 231, which also functions as a pressure window is positioned in front of optical coupler 227.

A second component, mechanically mated to the first component of the optical data coupler includes a transparent interface window plate 232 that is positioned near interface window plate 231. A gap 237 is permitted to exist between interface window plates 231, 232. On the other side of interface window plate 232 is connector 245, which includes a receiving coupler element 249. Receiving coupler element 249 is mounted to a receiving ferrule 251. A ball lens 255 is located on the proximal portion of ferrule 251 that is closest to interface window plate 232. Receiving coupler element 249 is connected to optical cable 263.

Interface window plates 231, 232 provide protection from possible contamination or distortion attributable to the operating environment and may be removed in cases in which it is not required that the optical coupler 201 be sealed from the outside environment. In the case of a coupler used in an aqueous environment the sealing prevents water ingest.

Coupler 201 is configured so that an optical signal received through optical cable 223 is transmitted by optical coupler element 227, through non-fiber media, is received at optical coupler element 249 and transmitted through optical cable 263. In being transmitted by optical coupler element 227 and received at optical coupler element 249, the optical signal passes across interface window plates 231, 232 and the gap 237.

While gap 237 is described, coupler 201 can be used so that no gap or virtually no gap exists between window plates 231, 232. Similarly, it is possible to construct coupler 201 without window plates 231, 232, provided that protection from the environment is not required; however, it is contemplated that a change in environment may affect performance.

Receiving coupler element 249 is configured to permit angular and lateral misalignment of the first data coupler component with the optical coupler element 227 contained in the second optical data coupler component. In one example configuration, the maximum design misalignment is ±5°. In other configurations, misalignment of up to ±8° may be tolerated, although larger amounts of misalignment up to ±14.5° would still allow functionality but with significant optical power loss. By providing different types of fibers, or using lower refractive index ball lenses, even larger angles of misalignment are permitted. The apparatus can be configured to require alignment within narrower ranges, such as ±4°, ±2° and ±1°, with narrower specifications possible. Lateral misalignment is possible, as determined by the diameter of the beam transmitted by the transmit optical coupler. Ball lens 255 is used to provide good angular misalignment tolerance; however, other lens configurations are possible, provided that the signal can be transmitted to ball lens 255. It is noted that the combination of lateral and angular misalignment may be cumulative, so a tolerable angular misalignment may be less tolerable with a significant lateral misalignment, and vice-versa.

The performance parameters described herein are given by way of non-limiting example. In the example, the performance is taken in an underwater ocean environment.

Figure 3:
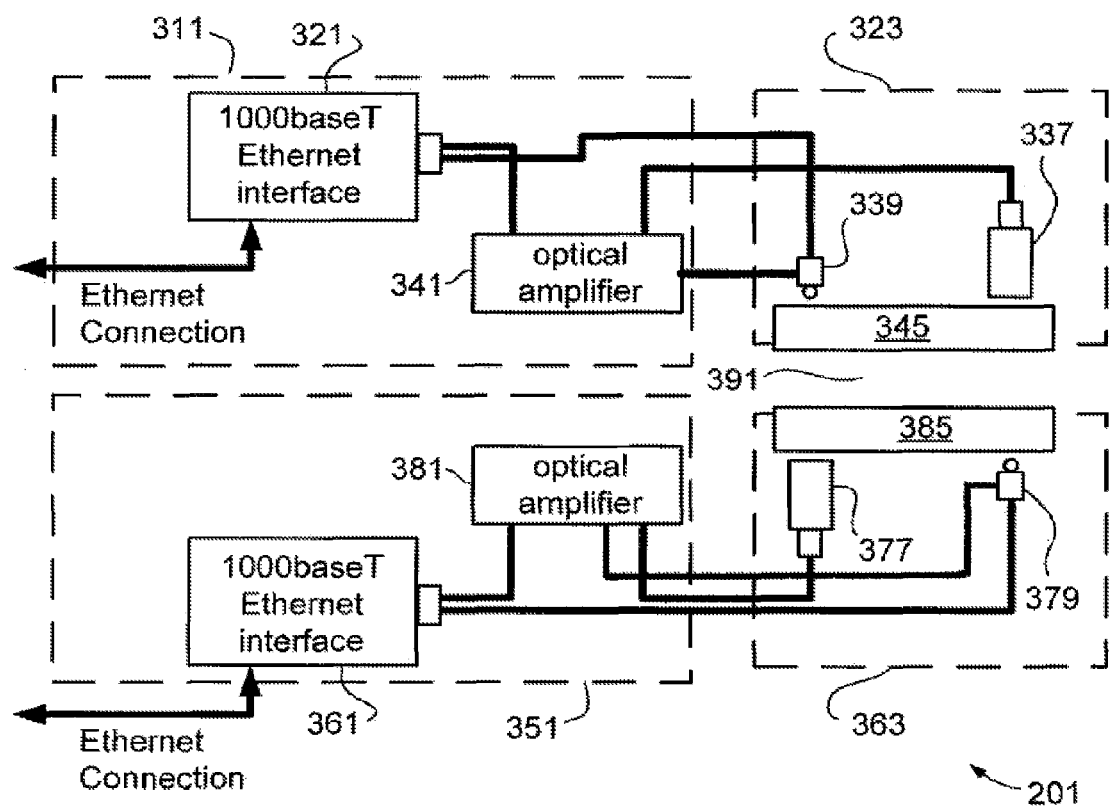
FIG. 3 is a schematic block diagram showing the data conversion operations using optical couplers of the present invention.

FIG. 3 is a schematic block diagram showing the data conversion operations used in optical data coupler 201. The upper portion of the figure illustrates a first optical conversion circuit 311, which includes first Ethernet interface 321 and first optical coupler subassembly 323. First optical conversion circuit 311 is connected, at first optical coupler subassembly 323, to first transmitting optical coupler element 337 and received at first optical receiving coupler element 339, both elements are connected to first optical amplifier 341. Also depicted is interface window plate 345.

The lower part of FIG. 3 depicts a similar arrangement, comprising a second optical conversion circuit 351, which includes second Ethernet interface 361 and second optical coupler subassembly 363. Second optical conversion circuit 351 is connected, at second optical coupler subassembly 363, to second transmitting optical coupler element 377 and to second optical receiving coupler element 379 connected to second optical amplifier 381. Also depicted is interface window plate 385. Optical coupler element 337 transmits optical signals which are received by optical coupler element 379. Similarly optical coupler element 377 transmits optical signals which are received by optical coupler element 339, as described above in connection with optical coupler elements 227 and 249.

The configuration of optical coupler 201 is such that data is converted at Ethernet interfaces 321, 361, transmitted or received via optical coupler elements 337, 339, 377, 379, through interface window plates 345, 385 and gap 391 which separates interface window plates 345, 385. It should be noted that use of the optical amplifiers 341, 381 are depicted as representative configurations and could be alternatively incorporated through any feasible combination of dedicated or shared optical amplifiers within an optical coupler subassembly. It is also possible that no optical amplifier would be utilized and the optical data coupler could rely instead upon increased transmitter power output and/or receiver sensitivity in the Ethernet interfaces.

In one configuration, light from a laser data transmitter at a wavelength of 1270 nm propagates through a reinforced 9/125 µm single mode optical fiber terminated with an FC/PC fiber optic connector. The wavelength of transmission is selected in this example because 1270 nm is an optical wavelength at which the attenuation of the optical signal in water is relatively low and assumes the coupler is operating in a water environment. The connector attaches to a 11 millimeter focal length collimating telescope inside of the first optical data coupler (Thorlabs Model F220FC-C, produced by Thorlabs, Inc. of Newton, N.J.) where the light is collimated to form a 2.2 millimeter diameter optical beam. The beam of light shines through the first polycarbonate pressure window, through the gap, and through the second pressure window, and into the light collector in the second optical data coupler. A small portion of the incident light (about 2-5%) is captured by a 2.5 millimeter diameter ball lens (Align Optics Model L986991 produced by Align Optics Inc. of Sunrise, Fla.) in the second optical data coupler component and focused onto the core of the receiving fiber, a reinforced 62.5/125u multimode optical fiber terminated with an FC/PC connector. This fiber transfers the captured light to the data amplifier and on to a receiver where the digital data signal is extracted. Only a small area of the windows are used by each coupler pair to transmit and receive the light beam, and therefore, multiple data channels can be accommodated using a single set of pressure windows by simply spacing the channels physically. The light beams can be transmitted in the same direction or in opposite directions so that each optical data coupler component may be simultaneously transmitting and receiving data.

Figure 4:
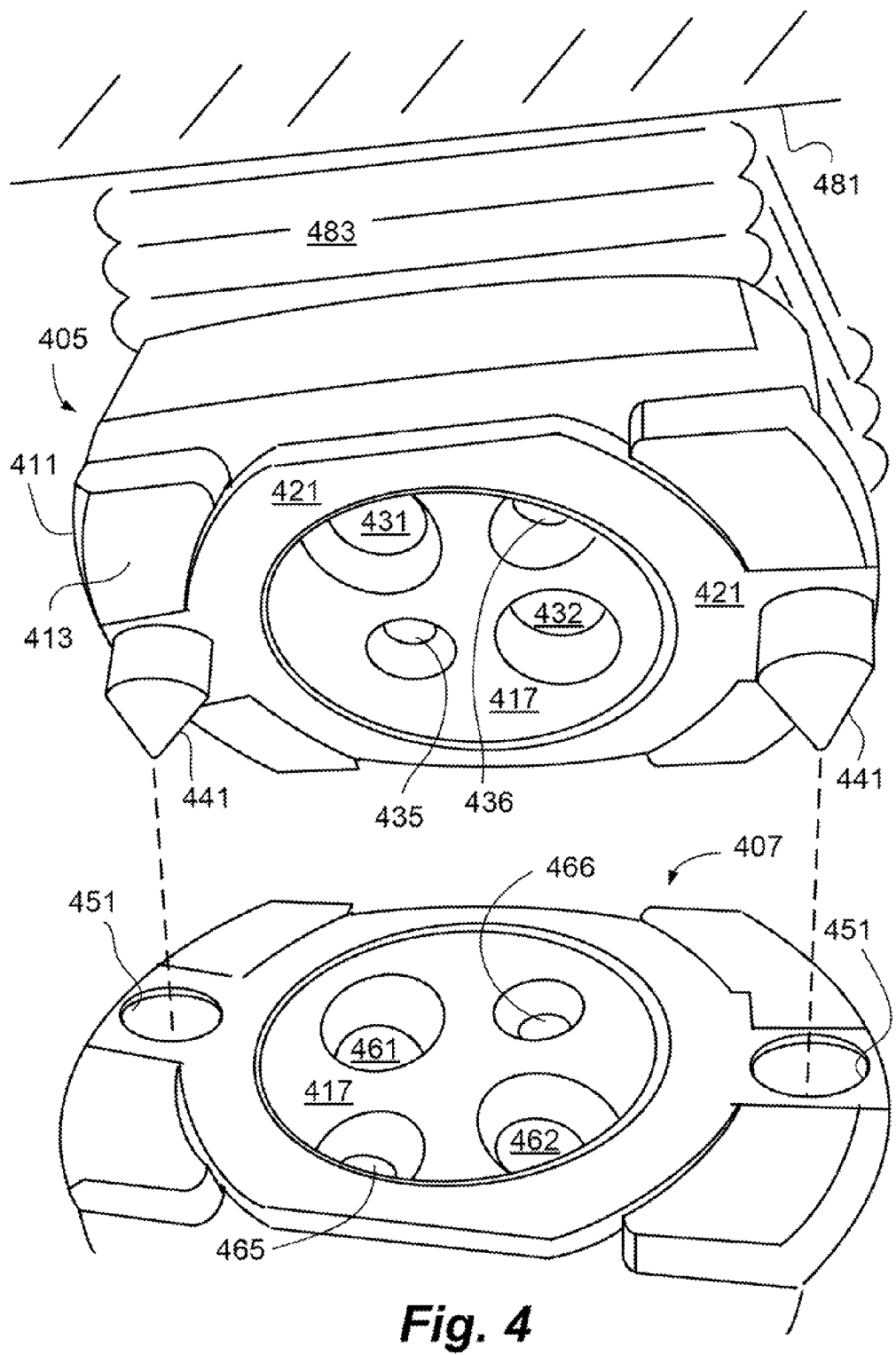
FIG. 4 is a diagram depicting one embodiment of a coupler assembly of the present invention.

The angular misalignment tolerance can be increased significantly by incorporation of a multimode fiber optic receiver pigtail fiber in many applications. Angular misalignment tolerance as high as +/−6° has been demonstrated to be achievable empirically. Seawater in the gap between the transparent pressure windows exhibits high attenuation in the optical C Band (1550 nm nominal wavelength); however, the attenuation losses due to seawater can be minimized by making the gap very thin (<1 mm) or operating at shorter optical wavelengths near 1310 nm (e.g., 1270 nm) where the attenuation of water is much lower. FIG. 4 is a diagram showing a physical layout of mating an optical data coupler having components 405, 407 implementing the techniques that are described above for FIGS. 2 and 3. Optical data coupler component 405 includes coupler body 411, having a data interface side 413. A first interface window plate 417 is mounted on interface pin plate 421 on the data interface side 413. Behind interface window plate 417 are a pair of transmit optical coupler elements 431, 432 and a pair of receive optical coupler elements 435, 436. Interface pin plate 421 also includes a pair of alignment pins 441, which mate with alignment sockets 451 on coupler component 407.

Interface window plate 417 is mounted to coupler body 411 and is sealed against coupler body 411 to establish a watertight seal. Optical coupler elements 431, 432, 435, 436 and optical coupler elements 461, 462, 465, 466 are positioned so that, when coupler components 405 and 407 are mated via alignment mechanism 441 and 451, transmit optical coupler elements 431, 432 are aligned with corresponding receive optical coupler elements 465, 466 in mating coupler component 407 and receive optical coupler elements 435, 436 are aligned with corresponding transmit optical coupler elements 461, 462 in mating coupler component 407. The alignment is maintained by the engagement of alignment pins and sockets 441, 451 respectively. One or both optical coupler components may be articulated. If the optical data coupler of FIG. 4 is used in an environment where sealing is important, the coupler components 405, 407 may be sealed with respect to the device it is attached to or integrated onto. This is depicted in FIG. 4, in which coupler component 405 is shown as affixed and sealed against an apparatus 481 by bellows 483.

The techniques for alignment of coupler assemblies 405, 407, are also given by way of non-limiting example and may be accomplished through any well known engagement mechanisms, such as the pin and socket depicted, interlocking fingers, or magnetically controlled such as via matched magnets. In general, the transmit optical couplers 431, 432 are aligned with corresponding receive optical couplers 461, 462 in order to provide transmission of optical data within the optical constraints of the optical couplers 431, 432, 435, 436.

The optical data coupler design is based upon an asymmetric expanded optical beam concept which is intended to be relatively insensitive to translational and angular misalignment and tolerant of contamination and fouling on the optical surfaces. By way of non-limiting example, the couplers are brought into physical contact with alignment tolerances on the order of ±2.5 mm and angular tolerances on the order of +/−6° in order to establish a bidirectional optical circuit capable of supporting a bandwidth of several GHz. A movable mating coupler, attached to an expandable bellows 483 (FIG. 4) may be normally retracted and extended upon anticipation of a device having a similar optical data coupler component. When data transfer is complete the bellows are depressurized, the optical data coupler component 405 is retracted Because the connection requires "zero force" to couple or un-couple, robotic equipment may utilize the optical data coupler described herein with greater confidence that the coupling process will have minimized risk of unintended "trapping" or damage of the robotic equipment due to faulty un-coupling, or failing to transmit data due to poor coupling.

The optical data coupler design has the advantage that, by incorporating a known excess insertion loss into the optics design (i.e., intentional mismatching of the transmitting and receiving optics magnification ratio), a corresponding relaxation in the required mechanical alignment tolerances for the completed data coupler results.

The known excess insertion loss is essentially constant, and because the excess insertion loss is constant, it can be compensated by increased transmitting power and/or increased receiving sensitivity. Compensation by increased transmitting power can be achieved by incorporation of either an erbium-doped amplifier (EDFA) or a semiconductor optical amplifier (SOA) in the transmitter fiber. Compensation by increased receiving sensitivity can be achieved by the use of an optical preamplifier in the receiver fiber or the use of a more sensitive avalanche photo detector (APD) instead of a photodiode p-n (PIN) detector.

The ability to compensate by increased transmitting power and increased receiving sensitivity is advantageous when used with discrete channel bidirectional communications, because this allows amplification to be performed at one side of the coupler. Thus, a device at one side of the coupler can provide increased transmitting power on its transmitting channel and provide increased receiving sensitivity on its receiving channel.

While bidirectional optical communication is described, it is also possible to use the disclosed techniques for transmitting optical data unidirectionally. When implementing unidirectional communications of optical data, control and request data in an opposite direction can be achieved by any convenient technique, such as by radio frequency or underwater ultrasound communications. Such unidirectional optical communications can be useful in applications in which large amounts of data are transmitted in one direction but not in the other direction.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. An optical data coupler, comprising:
   a first optical coupler component having a housing with an interface surface that contains at least one transmit optical coupler element and at least one receive optical coupler element affixed thereto;
   a second optical coupler component having a housing with an interface surface that contains at least one transmit optical coupler element and at least one receive optical coupler element affixed thereto;
   a first optical coupler alignment mechanism on the housing of said first optical coupler component and a second optical coupler alignment mechanism on the housing of said second optical coupler component; and
   an optical amplifier in each of the first and second optical coupler components, said optical amplifier coupled to each of the optical coupler elements in the respective first and second optical coupler components within which said optical amplifier is affixed,
   wherein the first and second optical coupler alignment mechanisms are such that upon engagement of the first optical coupler alignment mechanism with the second optical coupler alignment mechanism a transmit optical coupler element of the first optical coupler component is optically aligned with a receive optical coupler element of the second optical coupler component and a transmit optical coupler element of the second optical coupler component is optically aligned with a receive optical coupler element of the first optical coupler component.

2. The coupler of claim 1, further comprising:
   a first transparent interface window fixed to the interface surface of the housing of the first optical coupler component and a second transparent interface window fixed to the interface surface of the housing of the second optical coupler component.

3. The coupler of claim 2 further comprising a predetermined gap between the first and the second transparent interface windows, said gap is defined by the first and second optical coupler alignment mechanisms and optimized for a given operating environment.

4. The coupler of claim 3 wherein the operating environment is a liquid.

5. The coupler of claim 1, wherein each of the receive optical coupler elements includes a ball lens configuration on its interface proximal surface.

6. The coupler of claim 1, wherein the first optical coupler alignment mechanism comprises at least one pin on the housing of the first optical coupler component and the second optical coupler alignment mechanism comprises a socket on the housing of the second optical coupler component.

7. The coupler of claim 1, wherein at least one of the optical coupler components is affixed on one of its non-interface surfaces to a mechanism for retracting the coupler within a protective encasement in response to a control signal.

8. The coupler of claim 7, wherein the mechanism for retracting is a mechanical bellows.

9. An optical data coupler, comprising:
a first optical coupler component having a housing with an interface surface that contains at least one transmit optical coupler element and at least one receive optical coupler element affixed thereto;
an optical amplifier affixed to the housing of the first optical coupler component and connected to each of the optical coupler elements;
a second optical coupler component having a housing with an interface surface that contains at least one transmit optical coupler element and at least one receive optical coupler element affixed thereto, the optical coupler elements within the second optical coupler component not being optically tuned to the optical coupler elements in the first optical coupler component;
alignment mechanisms on the housing of said first and second optical coupler components; and,
a first transparent polycarbonate interface window fixed to the interface surface of the housing of the first optical coupler component and a second transparent polycarbonate interface window fixed to the interface surface of the housing of the second optical coupler component;
wherein the alignment mechanisms are such that upon engagement of the first optical coupler alignment mechanism with the second optical coupler alignment mechanism a transmit optical coupler element of the first optical coupler component is optically aligned with a receive optical coupler element of the second optical coupler component and a transmit optical coupler element of the second optical coupler component is optically aligned with a receive optical coupler element of the first optical coupler component.

10. The coupler of claim 9, further comprising a predetermined gap between the first and the second transparent interface windows, said gap is defined by the alignment mechanisms and optimized for a given operating environment and wherein the interface windows provides a watertight seal on the interface surface of its respective optical coupler component.

11. The coupler of claim 9, wherein the optical amplifier provides an amplified optical data stream to the transmit optical coupler element in anticipation of signal degradation across the coupler gap.

12. The coupler of claim 9, wherein the optical amplifier in the first optical coupler component is coupled to a receive optical coupler element in order to provide amplification of a degraded optical signal provided by the receive optical coupler element from a transmit coupler element in the second optical coupler component.

13. The coupler of claim 9, wherein each of the receive optical coupler elements includes a ball lens configuration on its interface proximal surface.

14. The coupler of claim 9, wherein the alignment mechanism comprises matched magnets.

15. The coupler of claim 9, wherein at least one of the optical coupler components is affixed on one of its non-interface surfaces to a mechanism for retracting the coupler within a protective encasement in response to a control signal.

* * * * *